April 5, 1932.    R. G. LE TOURNEAU    1,852,618
DUMP CART
Filed Feb. 24, 1930    2 Sheets-Sheet 1

INVENTOR
R. G. Le Tourneau
BY
ATTORNEY

April 5, 1932. R. G. LE TOURNEAU 1,852,618
DUMP CART
Filed Feb. 24, 1930 2 Sheets-Sheet 2
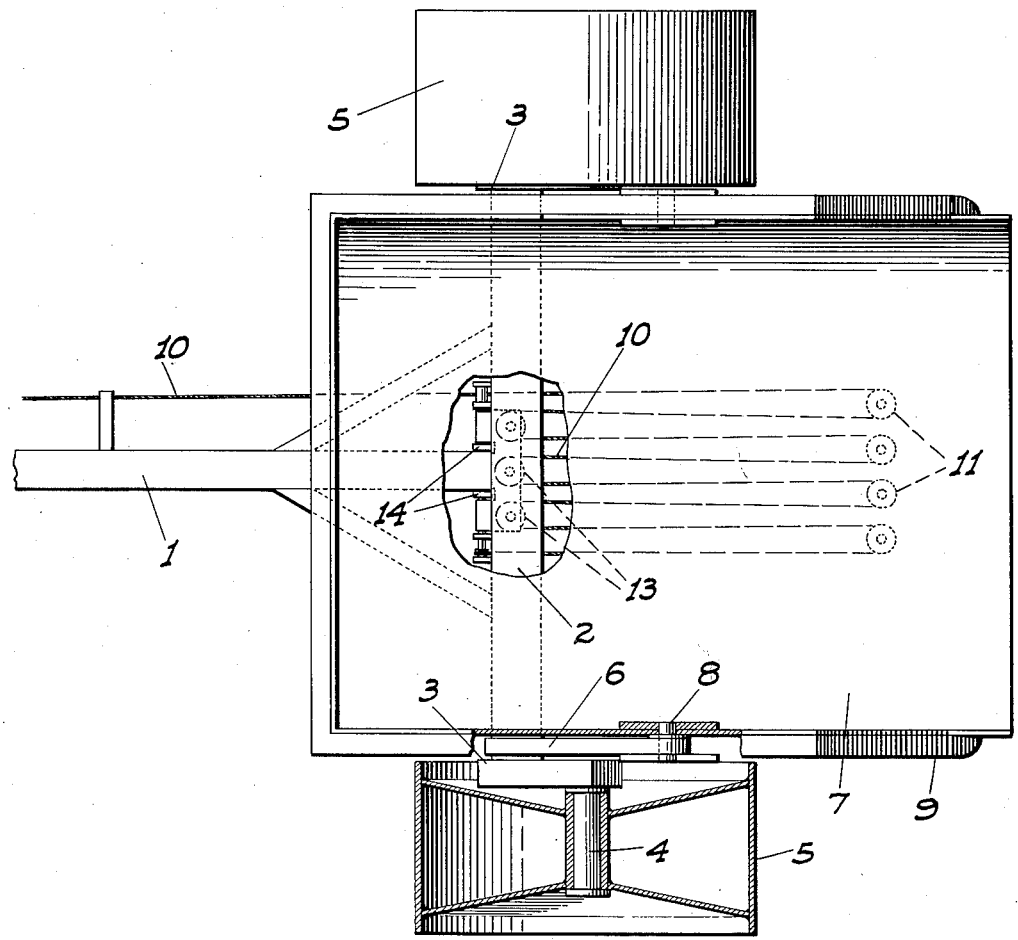

Patented Apr. 5, 1932

1,852,618

UNITED STATES PATENT OFFICE

ROBERT G. LE TOURNEAU, OF STOCKTON, CALIFORNIA

DUMP CART

Application filed February 24, 1930. Serial No. 430,743.

This invention relates to two-wheel dump carts used to receive dirt from excavator buckets and then lay and convey such dirt to some other point for discharging.

The principal objects of my invention are to provide a cart of this character having a dumping mechanism of an extremely simple nature, and which is located entirely underneath the frame and body of the cart, so that it will not interfere with the placing of dirt into the body from any side or angle; and one in which the center of gravity or center of load area of the body as it is moved to a dumping position, moves forwardly rather than rearwardly of its pivotal or hinge connection, thus relieving the rearward overhang of the load otherwise had and which would tend to tip the tongue of the cart upwardly.

A further object is to so mount the body of the cart that when it is moved to its full dumping position its blade or discharge edge will lie just behind the wheel axle. Said edge will therefore have substantially the same swing or arc of turning as the wheel-axles as the cart swings or turns. This enables the cart to be used for dirt spreading purposes when being backed up after discharging, and makes the device in effect a bulldozer; as will be evident. This feature insures that the dirt as discharged or dumped will be retained in a compact heap regardless of how sharp a turn may be made at the time by the cart.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 3 is a top plan view of the cart, certain parts being broken out and others in section.

Figure 1:
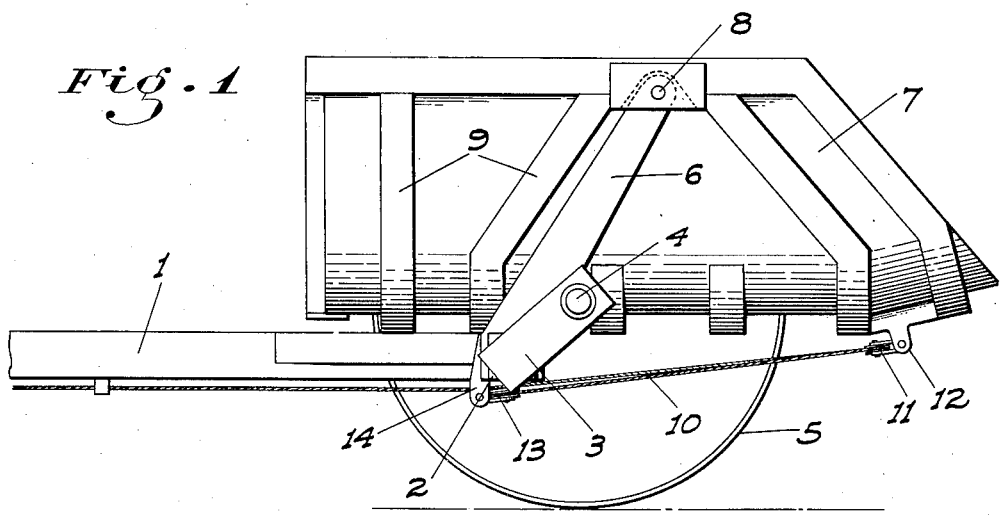
Fig. 1 is a side elevation of my improved cart in its normal or loading position, with the rear wheel removed.
Figure 2:
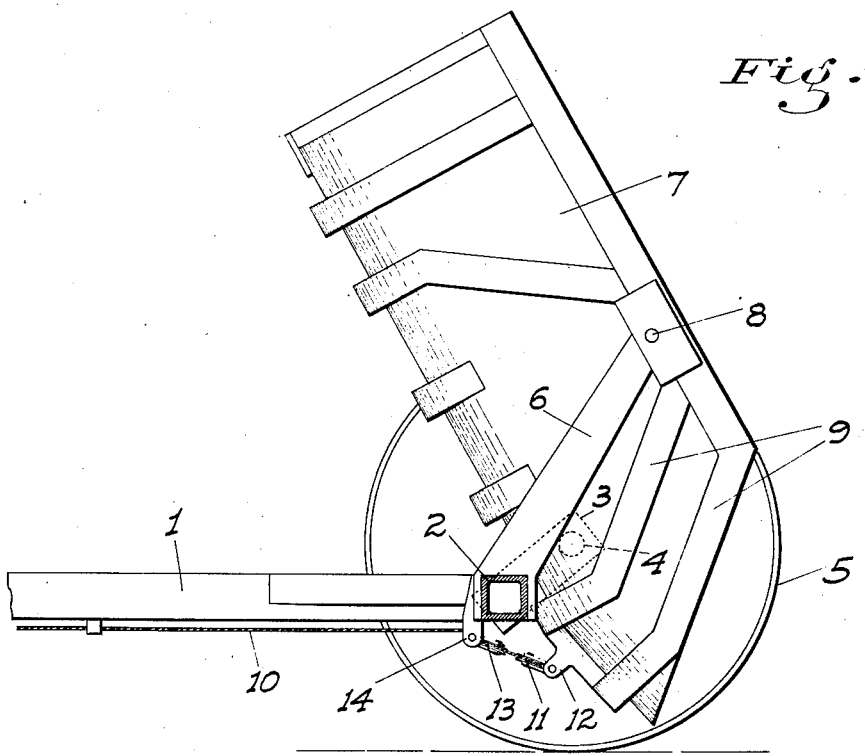
Fig. 2 is a similar view showing the body of the cart in its dumping position.

Referring now more particularly to the characters of reference on the drawings, the supporting frame of the cart comprises a tongue 1 to the rear end of which a cross beam 2 is rigidly connected. These members are preferably of built-up tubular or box-like form in cross section, as in all my apparatus, so as to provide a very rigid yet relatively light structure. The tongue at its front end is adapted to be connected to and supported by a tractor.

Rearwardly and upwardly projecting arms 3 are rigidly connected to the ends of the cross-beam 2, and toward their upper ends carry outwardly projecting spindles 4 on which the wheels 5 are turnably supported. Just inwardly of the arms 3 standards 6, vertical in a transverse plane, project rearwardly and upwardly to terminations rearwardly of the wheel spindles. At their upper ends said standards are pivoted onto the top sills of the cart-body 7 by means of pins 8; said body being freely open from top to bottom at its rear end. This cart is preferably constructed of sheet metal reinforced by external ribs 9 of suitable form. The standards 6 are disposed between the central ones of these ribs so as to be as close to the body as possible and thus allowing the wheels to be very close to the body.

The body normally rests on the tongue and cross beam and extends rearwardly of the same a considerable distance. Pins 8 however are disposed some distance rearwardly of the longitudinal center or load area of the body, so that there is no tendency for the latter to tip rearwardly as the load accumulates. The frame also has no tendency to tip up at its forward end since the standards, which partly support the body, are connected to the frame ahead of the wheel axles, as will be evident. The length of the body rearwardly of the plane of the pins and relative to the cross-beam is such that it may be tipped down toward its rear to nearly a vertical position and so that the bottom of the body at its open or discharge end is near the ground and is only a short distance rearwardly of the wheel spindles. One of the ribs 9 then abuts against the cross-beam and limits further downward tilting movement of the body.

It will therefore be seen that by means of the above arrangement, with the movement of the body from its normal to a full dumping position, the center of gravity or the center of load area of the body will not move rearwardly relative to the wheels and supporting beams but if anything will shift forwardly somewhat. This avoids any increase in the rear or overhanging load such as with a large cart would place a heavy upward strain on the tongue and the tractor to which it is attached. The bottom edge of the body being close to the line of the wheel axles when fully tilted or lowered, the dirt will be spread just behind the wheels, and the arc of swinging of said edge, when the cart is turning, will be practically no greater than that of the arc of turning of the axle line itself. As stated, this feature enables the structure to be efficiently used for dirt spreading purposes, or as a bulldozer.

The body is pulled from a normal to a discharging position by means of a cable 9 which extends from a power driven drum on the tractor (not shown) alongside the tongue and is anchored at its end opposite the drum onto the cart adjacent or in direct connection with the beam 2. Between the tongue and its anchor the cable passes alternately about transversely alined sheaves 11 flexibly supported from brackets 12 depending from the under side of the body; and similarly disposed sheaves 13 flexibly supported from brackets 14 depending from the forward side of the beam 2. A multiple sheave block and tackle structure is thus provided which lessens the power necessary to actuate the cable; the flexible mounting of the sheaves enabling the same to always remain in alinement with each other regardless of any shifting of position of the body and the sheaves thereon relative to the first cross beam and the corresponding sheaves. This arrangement not only provides a very convenient and efficient point for connecting the body controlling or dumping mechanism, but keeps such mechanism entirely out of the path of the dirt being either deposited in the body or when being discharged therefrom. It is therefore easier to load the body since there is no interference with the control mechanism, and the latter will never be fouled by being showered with the dirt at any time.

The body abutting against the cross-beam of the frame when the blade is in its foremost and lowermost position, said blade is positively braced against further movement in that direction when the cart is being backed up and used as a spreader or bulldozer.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A dump cart comprising a frame structure, wheels supporting the same, a normally horizontal body over the frame projecting rearwardly of the wheels and open at its rear ends, standards projecting upwardly from the frame ahead of the wheel-axes to terminations rearwardly of said axes, and pivot connections between the upper ends of the standards and body at points rearwardly of and above the center of gravity of the body.

2. A dump cart comprising a frame, wheels supporting the frame adjacent its rear end, standards secured to the frame forwardly of the axis of the wheels and extending upwardly and rearwardly and crossing such axis, a bowl pivoted to the outer ends of the standard at points to the rear of the center of gravity of the bowl whereby the bowl will normally rest of its own weight on the frame.

3. A dump cart as in claim 2, and means to tilt the bowl on the pivots.

4. A dump cart comprising a frame, arms projecting from and beyond the rear end of the frame, wheels journaled on the outer ends of the arms, standards mounted on the frame forwardly of the axis of the wheels and projecting upwardly and rearwardly and crossing such axis, and a bowl pivoted to the outer ends of the standards at points to the rear of the center of gravity of the bowl whereby the bowl will normally rest of its own weight on the frame.

In testimony whereof I affix my signature.

ROBERT G. LE TOURNEAU.